United States Patent
Hong et al.

(10) Patent No.: US 11,629,214 B2
(45) Date of Patent: Apr. 18, 2023

(54) PRODUCING BLOCKS OF BLOCK COPOLYMER IN A SEPARATOR DOWNSTREAM OF A REACTOR

(71) Applicant: ExxonMobil Chemical Patents Inc., Baytown, TX (US)

(72) Inventors: Yifeng Hong, Houston, TX (US); Shanshan Zhang, Houston, TX (US); Jay L. Reimers, Houston, TX (US)

(73) Assignee: EXXONMOBIL CHEMICALS PATENTS INC., Baytown, TX (US)

(*) Notice: Subject to any disclaimer, the term of this patent is extended or adjusted under 35 U.S.C. 154(b) by 369 days.

(21) Appl. No.: 16/943,374

(22) Filed: Jul. 30, 2020

(65) Prior Publication Data
US 2021/0047454 A1    Feb. 18, 2021

Related U.S. Application Data

(60) Provisional application No. 62/887,903, filed on Aug. 16, 2019.

(51) Int. Cl.
| | | |
|---|---|---|
| *C08F 293/00* | (2006.01) | |
| *C08F 2/38* | (2006.01) | |
| *C08F 2/01* | (2006.01) | |
| *C08F 210/06* | (2006.01) | |
| *C08F 210/16* | (2006.01) | |
| *C08F 210/10* | (2006.01) | |

(52) U.S. Cl.
CPC .................. *C08F 293/00* (2013.01)

(58) Field of Classification Search
CPC .......... C08F 293/00; C08F 2/38; C08F 2/001; C08F 210/06; C08F 297/083; C08F 210/16

See application file for complete search history.

(56) References Cited

U.S. PATENT DOCUMENTS

| | | |
|---|---|---|
| 2011/0028654 A1 | 2/2011 | Sita et al. |
| 2013/0109900 A1 | 5/2013 | Sita et al. |
| 2013/0144009 A1 | 6/2013 | Gonzalez Montiel et al. |
| 2018/0086857 A1* | 3/2018 | Karjala ................. C08F 210/16 |

* cited by examiner

*Primary Examiner* — Robert D Harlan (57) ABSTRACT

A method for producing block copolymers can include polymerizing a feedstock comprising a monomer and a comonomer under first polymerization conditions in the presence of a catalyst in a reactor to produce a first effluent comprising a first polyolefin block, an unreacted monomer, and an unreacted comonomer; blending the first effluent with a coordinative chain transfer polymerization agent to produce a mixture; and polymerizing the mixture in a separator under second polymerization conditions to cause the unreacted monomer and the unreacted comonomer to polymerize onto one end of the first polyolefin block as a second polyolefin block, thereby forming a block copolymer, wherein the first polyolefin block has a first comonomer content and the second polyolefin block has a second comonomer content that is different than the first comonomer content. The method can further include polymerizing in presence of a second coordinative chain transfer polymerization agent in a second separator.

20 Claims, 2 Drawing Sheets

PRODUCING BLOCKS OF BLOCK COPOLYMER IN A SEPARATOR DOWNSTREAM OF A REACTOR

CROSS-REFERENCE TO RELATED APPLICATIONS

This application claims priority to U.S. 62/887,903, filed Aug. 16, 2019, herein incorporated by reference.

BACKGROUND

The present disclosure relates to producing block copolymers.

Solution polymerization and slurry polymerization are two major processes by which polymerization can be performed at an industrial scale. Solution polymerization involves dissolution of polymers in solvents while slurry polymerization involves suspension of the polymers in solvents. In the solution polymerization process, monomer, comonomer catalyst/activator, and polymers are dissolved in a solvent, typically a nonreactive solvent. The monomer and comonomer are polymerized at elevated temperatures in reactors, such as continuous stirred-tank reactors (CSTR). The heat released by the reaction is absorbed by the solvent and removed by various methods including, but not limited to, chilling the feed solvent, reflux cooling, jacketed cooling, and external heat exchangers. The reactor effluent is then transferred from the reactor for further processing. Typically, the solvent and unreacted monomers and comonomers are separated from the polymers in a polymer concentration stage after the reaction. The polymer concentration stage may be performed by various methods including vapor-liquid separation, liquid-liquid separation, or both. The polymer concentration stage may be performed in one or more separation vessels. The polymer concentration stage is followed by a devolatilization stage, where the residual solvent and unreacted monomers and comonomers are removed from the polymers. The devolatilization stage is typically performed using vacuum and continuous surface area renewal processes. The resulting molten polymers are then extruded and pelletized in water to form small pellets, which are dried and bagged sequentially.

A "block copolymer" is a polymer comprising multiple sequences, or blocks, of the same monomer alternating in series with different monomer blocks. The blocks are covalently bound to each other such as AB, ABA, BAB, BABA, and the like, where A and B are different blocks. Block copolymers are classified based on the number of blocks they contain and how the blocks are arranged. For example, block copolymers with two blocks are called diblock copolymers; those with three blocks are triblock copolymers; and those with more than three are called multiblock copolymers. Classifications by arrangement include the linear, or end-to-end, arrangement and the star arrangement, in which one polymer is the base for multiple branches. The importance of block copolymers derives from their unique and useful properties in solution and in the solid state. These properties result from the combination of different polymers in alternating sequence, which may produce a thermodynamic incompatibility between the blocks, or micro-phase separation. For example, the properties of thermoplastic elastomers, which are a class of block copolymers, are directly derived from the composition-dependent morphology of these polymers. An example of elastomer use is in the hygiene market due to their excellent properties at body temperature due to their unique "hard"-"soft"-"hard" block segment along the backbone. The assembling among "hard" segments provides strong retractive force when the polymer is stretched, and the "soft" block segment provides the flexibility of the polymer chains.

There are various methods to make block copolymers on an industrial scale. One method is to arrange two or more reactors in series. The number of the reactors is determined by the number of blocks needed. The reaction sites remain active during the transition between reactors by using a specially designed catalyst, by controlling reactor residence time, and/or by adding a coordinative chain transfer polymerization (CCTP) agent. The advantage of this method is that the control of the block copolymer microstructure is simple and accurate. However, the capital investment into the series of reactors can be substantial, especially in large commercial plants. Moreover, the building of serial reactors may be cost prohibitive, in particular, if the block copolymer is only a marginal product of the plant facility.

A second method to produce block copolymers is to use a dual catalyst system in a single reactor. Although the capital cost can be considerably reduced with this method, the block copolymer microstructure produced by this method is not well controlled because of the complexity of the polymerization kinetics and species interactions of a dual catalyst system.

Therefore, an economical and easily-controlled method to produce block copolymers is highly desirable.

SUMMARY OF THE INVENTION

The present disclosure relates to producing block copolymers by polymerization of monomers and comonomers in a reactor and by continuing the polymerization reaction in the polymer concentration stage by adding a CCTP agent.

A first nonlimiting example embodiment is a method comprising polymerizing a feedstock comprising a monomer and a comonomer under first polymerization conditions in the presence of a catalyst in a reactor to produce a first effluent comprising a first polyolefin block, an unreacted monomer, and an unreacted comonomer; blending the first effluent with a coordinative chain transfer polymerization agent to produce a mixture; and polymerizing the mixture in a separator under second polymerization conditions to cause the unreacted monomer and the unreacted comonomer to polymerize onto one end of the first polyolefin block as a second polyolefin block, thereby forming a block copolymer, wherein the first polyolefin block has a first comonomer content and the second polyolefin block has a second comonomer content that is different than the first comonomer content.

A second nonlimiting example embodiment is a method comprising polymerizing a feedstock comprising a monomer and a comonomer under first polymerization conditions in the presence of a catalyst in a reactor to produce a first effluent comprising a first polyolefin block, an unreacted monomer, and an unreacted comonomer; blending the first effluent with a first coordinative chain transfer polymerization agent to produce a mixture; polymerizing the mixture in a first separator under second polymerization conditions to cause the unreacted monomer and the unreacted comonomer to polymerize onto one end of the first polyolefin block as a second polyolefin block, thereby forming a block copolymer, wherein the first polyolefin block has a first comonomer content and the second polyolefin block has a second comonomer content that is different than the first comonomer content, and wherein a second effluent comprises the block copolymer, the unreacted monomer, and the unreacted comonomer; blending the second effluent with a second coordinative chain transfer polymerization agent to produce a second mixture; and polymerizing the second mixture in a second separator under third polymerization conditions to cause the unreacted monomer and the unreacted comonomer to polymerize onto one end of the second polyolefin block as a third polyolefin block of the block copolymer, wherein the third polyolefin block has a third comonomer content that is different than the second comonomer content.

BRIEF DESCRIPTION OF THE DRAWINGS

The following figures are included to illustrate certain aspects of the embodiments and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present disclosure relates to methods for producing block copolymers by polymerization of monomers and comonomers in a reactor to produce a first block and by continuing the polymerization reaction to produce additional blocks in the polymer concentration stage by adding a CCTP agent.

Figure 1:
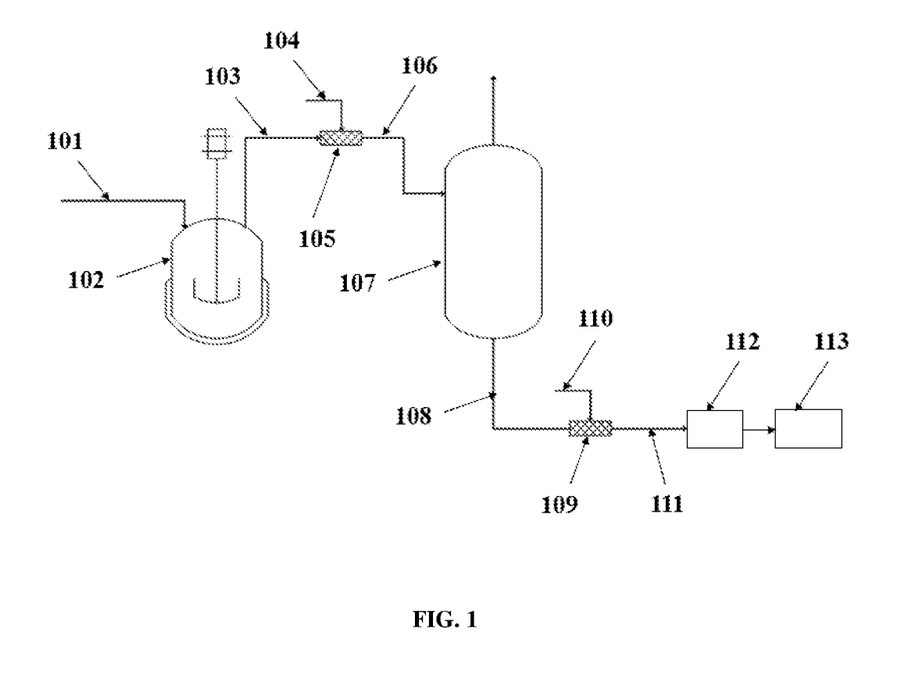
FIG. 1 illustrates a diagram of a process flow for the production of block copolymers including one separator.

More specifically, as illustrated in the example of FIG. 1, a first step of polymerization of a feedstock 101 takes place in a CSTR 102 making a first polyolefin block of a desired block copolymer. Then, the effluent 103 from the CSTR is blended with a CCTP agent 104 in a static mixer 105 resulting in a mixture 106, which is transferred to a separator (e.g., flash vessel) 107 in the traditional polymer concentration stage.

The CCTP agent 104, as described in detail below, keeps one end of the first polyolefin block active for further polymerization. The conditions in the separator 107 (e.g., temperature, pressure, and residence time) are carefully altered to adjust the unreacted monomer and comonomer profile at the bottom of the separator to make the second polyolefin block of the block copolymer that differs from the first polyolefin block, one chain only having one active site at the end of the chain end, such that the next block will only grow in one direction, making only diblock.

The effluent 108 from the separator 107 then flows through a second static mixer 109. If a diblock copolymer is desired, a quenching agent 110 is added to the effluent from the first separator to kill the active sites. The effluent 111 from the second static mixer 109 is then transferred to a devolatilization unit 112 and further to a finishing unit 113.

Figure 2:
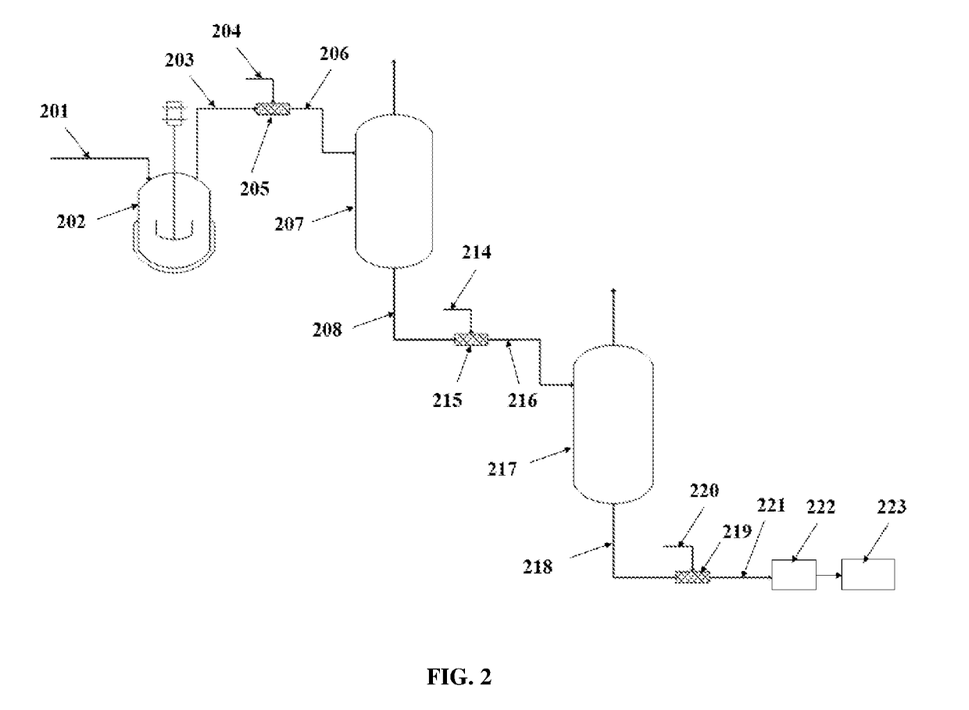
FIG. 2 illustrates a diagram of a process flow for the production of block copolymers including two separators.

If more blocks are desired, as illustrated in the example of FIG. 2, the methods for producing block copolymers may include two separators 207 and 217 after the CSTR 202. Similar to the method with one separator, a first step of polymerization of a feedstock 201 takes place in a CSTR 202, making a first polyolefin block of a desired block copolymer. Then, the effluent 203 from the CSTR is blended with a first CCTP agent 204 in a first static mixer 205 resulting in a mixture 206, which is transferred to the first separator (or flash vessel) 207. The effluent 208 from the first separator 207 then flows through a second static mixer 215, where a second CCTP agent 214, which may be the same or different from the first CCTP agent 204, is added resulting in a mixture 216, which is transferred to the second separator 217. The effluent 218 from the second separator 217 then may flow to a third static mixer 219, where a quenching agent 220 may be added. The effluent 221 from the third static mixer 219 is then transferred to a devolatilization unit 222 and further to a finishing unit 223. The steps of adding a CCTP agent to the effluent from a separator and sending the mixture to a different separator or flash vessel may be repeated with additional separators until the desired number of blocks is reached.

In any of the separators of the methods described herein, removal of solvents and/or unreacted monomers and/or unreacted comonomers via the separator can subsequently be recycled back into an upstream reactor or separator.

There are a number of differences between having a separator placed after a reactor, as described herein, versus having two separate reactors in series in order to prepare block copolymers. In a separator or flash vessel, phase change may be used to separate components in the vessel, by altering pressure and temperature, whereas in a reactor, reactants are very rarely separated, regardless of the thermodynamics, since they are expected to remain together in order to react. In a separator, the composition of reactants can be adjusted by evaporating a certain amount of reactants, while simultaneously carrying out the reaction. In contrast, the composition in a reactor is fixed upon feed injection. The use of separators or flash vessels, according to the methods described herein, allows the production of diblock or triblock polymers without modification to the existing process. As such, there is no need for an additional modification or capital investment, whereas using a second reactor instead of a separator placed after a first reactor would require additional investment and labor.

The methods of the present disclosure includes several advantages as compared with conventional methods of producing block copolymers. First, the methods of the present disclosure can use an existing solution or slurry polymerization process and require only very limited modifications to the process, resulting in a greatly reduced capital expenditure. Second, in the methods of the present disclosure, the polymerization of a first block and then addition of additional blocks are performed in a reactor and individual separators (or flash vessels), respectively, which avoids the usage of a dual catalyst system and its associated kinetics control difficulties. Third, the chemical composition of the sequential blocks in the block copolymer of the methods of the present disclosure can easily be controlled. For example, the ratio of unreacted monomer to unreacted comonomer in the effluent from the reactor or from a separator (or flash vessel) can be simply altered via evaporation of the volatiles under specific pressure and temperature and/or via control of the residence time, thus resulting in block produced in the separator to have different comonomer contents as compared to the reactor (or an upstream separator in the case of three or more blocks).

Definitions

As used herein, a "coordinative chain transfer polymerization (CCTP) agent" is a chain transfer agent capable of transferring a growing polyolefin chain in a polymerization process catalyzed by a single transition metal-based catalyst from the catalyst (active species) to the chain transfer agent (dormant species) via tansalkalation. A CCTP agent can be a main group (Group 1, 2, or 12-18) alkyl or aryl compound.

Examples of CCTP agents include, but are not limited to, a zinc, magnesium, or aluminum alkyl or aryl compound. Preferred CCTP agents comprise a zinc, magnesium, or aluminum alkyl compound where the alkyl is selected independently from methyl, ethyl, propyl, butyl, isobutyl, tertbutyl, pentyl, hexyl, cyclohexyl, and phenyl. A preferred CCTP agent is diethylzinc. In a coordinative chain transfer polymerization, one growing chain may be transferred to another molecule or chain, or one portion of a growing chain may be transferred to another portion of the same or independent chain. If the transfer is rapid compared to the propagation, if it is reversible and if it is the sole termination reaction, polymers with narrow distributions are obtained. If the chain transfer efficiency is high, most of the macromolecular chains are end-capped with the chain transfer metal, enabling further functionalization based on the chemistry of the main group metal. In the coordinative chain transfer polymerization reaction (1), Polymer* represents a growing polymeric chain, M represents the transition metal of the catalyst allowing propagation, L is the ligand coordinated to the metal of the catalyst, [CCTP] is the coordinative chain transfer polymerization agent, $k_p$ is the propagation rate constant, and $k_t$ is the reversible transfer rate constant.

(1)

As used herein, a "copolymer" refers to a polymer formed by the polymerization of at least two different monomers or of at least one monomer and one comonomer. For example, the term "copolymer" includes the copolymerization reaction product of propylene and an alpha-olefin, such as ethylene, 1-hexene. However, the term "copolymer" is also inclusive of, for example, the copolymerization of a mixture of propylene, ethylene, 1-hexene, and 1-octene. In another example, a copolymer includes monomer units derived from propylene, ethylene, and butene.

The term "monomer" or "comonomer," as used herein, can refer to the monomer or comonomer used to form the copolymer (i.e., the unreacted chemical compound in the form prior to polymerization) and can also refer to the monomer or comonomer after it has been incorporated into the copolymer.

When a polymer or polymer block is referred to as comprising a monomer (or comonomer), the monomer (or comonomer) is present in the polymer in the polymerized form of the monomer (or comonomer) or in the derivative form of the monomer (or comonomer). Thus, when a polymer or polymer block is said to comprise a certain monomer (or comonomer) content, that monomer (or comonomer) content is based on the total amount of monomer (or comonomer) units in the polymer or polymer block. That is, a polymer comprising an ethylene content of 30 wt % and a propylene content of 70 wt % is a polymer where 30 wt % of the polymer is ethylene-derived units and 70 wt % of the polymer is propylene-derived units. In another example, a polymer block comprising a propylene content of 75 wt % and an ethylene content of 25 wt % refers to a polymer block where 75 wt % of the polymer block is propylene-derived units and 25 wt % of the polymer block is ethylene-derived units. In yet another example, a polymer comprising a first polymer block having a propylene content of 80 wt % and an ethylene content of 20 wt % and a second polymer block having a propylene content of 5 wt % and an ethylene content of 95 wt % refers to a polymer comprising a first polymer block having 80 wt % propylene-derived units and 20 wt % ethylene-derived units and a second polymer block having 5 wt % propylene-derived units and 95 wt % ethylene-derived units.

As used herein, the "feedstock monomer to comonomer weight ratio" is a ratio of the total weight of monomer to the total weight of comonomer present in the feedstock prior to polymerization in the reactor.

As used herein, the "block copolymer concentration" is a weight percent of block copolymer relative to the solution mixture total weight.

As used herein, a "catalyst system" is the combination of at least one catalyst compound, at least one activator, and an optional co-activator.

Polymerization Process in the Reactor

The method of the present disclosure can include forming a first polyolefin block of a block copolymer by polymerizing monomers and comonomers in the presence of a catalyst system in a CSTR.

The reactor polymerization processes described herein may be carried out in any manner known in the art. Any solution, suspension, slurry, or gas phase polymerization process known in the art can be used. Such processes can be run in a batch, semi-batch, or continuous mode. Preferably, the polymerization process is continuous.

For example, the reactor polymerization process may be a slurry process. As used herein, the term "slurry polymerization process" means a polymerization process where a supported catalyst is employed and monomers are polymerized on the supported catalyst particles and at least 95 wt % of polymer products derived from the supported catalyst are in granular form as solid particles (not dissolved in the diluent). A slurry polymerization process generally operates between about 15 psig to about 735 psig (103 kPa to 5068 kPa), or even greater, and temperatures in the range of 0° C. to about 120° C. In a slurry polymerization, a suspension of solid, particulate polyolefin is formed in a liquid polymerization diluent medium to which monomer and comonomers along with catalyst are added. The liquid diluent employed in the polymerization medium is typically an alkane having from 3 to 7 carbon atoms, preferably a branched alkane. The medium employed should be liquid under the conditions of polymerization and relatively inert. Examples of diluents include, but are not limited to, methane, ethane, propane, butane, isobutane, isopentane, hexanes, heptanes, and any combination thereof. When a propane medium is used, the process must be operated above the reaction diluent critical temperature and pressure. Preferably, a hexane or an isobutane medium is employed.

Suitable diluents/solvents for polymerization include non-coordinating, inert liquids. Examples include straight and branched-chain hydrocarbons, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (ISOPAR™); perhalogenated hydrocarbons, such as perfluorinated C4-10 alkanes, chlorobenzene, and aromatic and alkylsubstituted aromatic compounds, such as benzene, toluene, mesitylene, and xylene. Suitable solvents also include liquid olefins that can be polymerized, including ethylene, propylene, 1-butene, 1-hexene, 1-pentene, 3-methyl-1-pentene, 4-methyl-1-pentene, 1-octene, 1-decene, and mixtures thereof. In a preferred example, aliphatic hydrocarbon solvents are used as the solvent, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another example, the solvent is not aromatic, preferably aromatics are present in the solvent at less than 1 wt %, preferably less than 0.5 wt %, preferably 0 wt % based upon the weight of the solvents.

In a preferred example, the feedstock concentration of monomers for the polymerization is 60 vol % solvent or less, preferably 40 vol % or less, or preferably 20 vol % or less, based on the total volume of the feedstock.

In another example where the reactor polymerization process is a solution polymerization, the process may comprise polymerizing one or more monomers and one or more comonomers dissolved in a solvent, as described herein, in the presence of a catalyst system under conditions to obtain an effluent comprising a solution of polyolefin and solvent and/or unreacted monomer and/or unreacted comonomer.

The solution polymerization processes in the reactor may be conducted under reactor polymerization conditions including a temperature of about 50° C. to about 250° C., preferably about 60° C. to about 230° C., preferably about 70° C. to about 200° C., preferably about 80° C. to about 170° C., or preferably about 90° C. to about 120° C. The polymerization process may be conducted at a pressure of about 120 psig to about 1800 psig (about 827 kPa to about 12,411 kPa), preferably about 200 psig to about 1000 psig (about 1379 kPa to about 6895 kPa), preferably about 300 psig to about 600 psig (about 2068 kPa to about 4137 kPa). Preferably, the pressure is about 450 psig (about 3103 kPa).

The weight ratio of monomer to comonomer in a feedstock can be about 1:1 to about 100:1, or about 2:1 to about 75:1, or about 5:1 to about 60:1. Where additional comonomers are used, the weight ratio of monomer to any additional comonomer individually in a feedstock can be about 1:1 to about 100:1, or about 2:1 to about 75:1, or about 5:1 to about 60:1.

Hydrogen may be present during the slurry and solution polymerization processes in the reactor at a partial pressure of about 0.001 psig to about 50 psig (about 0.007 kPa to about 345 kPa), preferably about 0.01 psig to about 25 psig (about 0.07 kPa to about 172 kPa), preferably about 0.1 psig to about 10 psig (about 0.7 kPa to about 70 kPa). The hydrogen partial pressure may be adjusted to modify the length ratio of the block copolymers obtained according to the disclosed methods.

Polymerization Reaction in a Separator

A separator is a vessel used to remove reactants (e.g. monomers) and/or solvent from effluent including product, such as polymer or polymer blocks. As such, separators generally have at least two outlets—one for removing reactants and/or solvent, and one for the exit of effluent—while reactors generally only have one outlet, for the exit of effluent. Separators may operate by using changes in temperature, pressure, or other means to remove reactants or solvent. For example, a separator may remove solvent by increasing temperature and reducing interior pressure, such as in a flash vessel. In another example, a separator may create conditions to enable liquid-liquid separation.

After polymerization in the reactor, the effluent from the reactor is mixed with a CCTP agent (example compositions provided above) and transferred to a separator for further polymerization to produce a second polyolefin block of the block copolymer. In a typical polymerization process, reactor effluent is quenched before flowing into a separator. However, when used for polymerization, the effluent is not be quenched before flowing into the separator. As described above, the process of adding polyolefin blocks to the block copolymer can be continued in subsequent separators and quenched at the desired number of blocks (e.g., 2 to 10, 2 to 6, or 2 to 4) in the block copolymer.

Adjacent blocks in the block copolymer differ in composition. To achieve different compositions, the reactants and/or the conditions in adjacent reactor/separator or adjacent separator/separator combinations are different. Such conditions may include, but not limited to, temperature, pressure, residence time, relative concentration of monomer and comonomer, the catalyst composition, and the like, and any combination thereof. The reactants in the separator may be changed by adding reactants to and/or removing reactants from the separator and/or the effluent flow before it enters the separator.

In a first nonlimiting example, additional monomer and/or comonomer can be added to the effluent of a reactor or separator to change the relative concentration of monomer and comonomer and the composition of the produced polyolefin block in the downstream separator.

In a second nonlimiting example, the monomer and comonomer can have different volatilities. Accordingly, adjusting the temperature and/or pressure in the downstream separator can cause one of these components to volatilize in the downstream separator to a higher degree, which, consequently, changes the relative concentration of monomer and comonomer and the composition of the produced polyolefin block in the downstream separator, as compared to the upstream reactor or separator.

In a third nonlimiting example, a second comonomer can be added to the effluent of a reactor or separator to change the composition of the reactants and produced polyolefin block in the downstream separator.

In a fourth nonlimiting example, a second catalyst can be added to the effluent of a reactor or separator. If the second catalyst has a different incorporation rate of the monomer and comonomer as compared to the catalyst used upstream, the relative concentrations of the monomer and comonomer in the produced polyolefin block in the downstream separator will be different, as compared to the upstream reactor or separator.

In a fifth nonlimiting example, the reaction kinetics for incorporating each of the monomer and comonomer for a given catalyst may be dependent on temperature and/or pressure. Accordingly, adjusting the temperature and/or pressure in the downstream separator can cause the relative concentrations of the monomer and comonomer in the produced polyolefin block in the downstream separator to be different, as compared to the upstream reactor or separator.

Combinations of the foregoing examples and other methods of changing the temperature, pressure, residence time, relative concentration of monomer and comonomer, the catalyst composition, and the like, and any combination thereof, may be used to produce different polyolefin block compositions in adjacent reactor/separator or adjacent separator/separator combinations.

The polymerization in a separator may be conducted at a temperature (also referred to as a flash temperature) of about 10° C. to about 200° C., preferably about 40° C. to about 180° C., preferably about 50° C. to about 160° C., preferably about 70° C. to about 150° C., preferably about 90° C. to about 120° C. If the temperature differs, the temperature in adjacent reactor/separator or adjacent separator/separator combinations can differ, either higher or lower, by about 5° C. to about 80° C., or about 10° C. to about 50° C., or about 20° C. to about 40° C.

The polymerization process in a separator may be conducted at a pressure of about 50 psig to about 500 psig (about 345 kPa to about 3447 kPa), preferably about 70 psig to about 300 psig (about 483 kPa to about 2068 kPa), preferably about 95 psig to about 165 psig (about 655 kPa to about 1138 kPa). If the pressure differs, the pressure in adjacent reactor/separator or adjacent separator/separator combinations can differ, either higher or lower, by about 1 psig to about 50 psig, about 2 psig to about 25 psig, or about 5 psig to about 15 psig.

The residence time of an effluent (or reaction mixture) in a separator may be about 10 seconds to 10 minutes, preferably about 30 seconds to about 5 minutes, or preferably about 1 minute to 3 minutes. If the residence time differs, the residence time of an effluent (or reaction mixture) in adjacent reactor/separator or adjacent separator/separator combinations can differ, either higher or lower, by about 1 second to about 5 minutes, or about 10 seconds to about 3 minutes, or about 30 seconds to about 1 minute.

The weight ratio of monomer to comonomer in a feedstock can be about 1:1 to about 100:1, about 2:1 to about 75:1, or about 5:1 to about 60:1. Where additional comonomers are used, the weight ratio of monomer to any additional comonomer individually in a feedstock can be about 1:1 to about 100:1, about 2:1 to about 75:1, or about 5:1 to about 60:1. If the weight ratio of monomer to a comonomer differs, the weight ratio of monomer to a comonomer in the bottom of each of the adjacent reactor/separator or adjacent separator/separator combinations taking into account volatilization of monomer and/or comonomer in each separator can differ, either higher or lower, by about 1.1 times to about 100 times, or about 1.5 times to about 50 times, or about 2 times to about 20 times. For example, in a separator the weight ratio of monomer to comonomer can be 2:1. Then, in an adjacent, downstream separator, the weight ratio of monomer to comonomer can be 1:1, which is a 2 times reduction (i.e., the #:1 weight ratio where the monomer # is divided by 2) in the weight ratio of monomer to comonomer. In another example, in a reactor the weight ratio of monomer to comonomer can be 2:1. Then, in an adjacent, downstream separator, the weight ratio of monomer to comonomer can be 2.2:1, which is a 1.1 times reduction (i.e., the #:1 weight ratio where the monomer # is multiplied by 1.1) in the weight ratio of monomer to comonomer.

Hydrogen may be present during the slurry and solution polymerization processes in the reactor at a partial pressure of about 0.001 psig to about 50 psig (about 0.007 kPa to about 345 kPa), preferably about 0.01 psig to about 25 psig (about 0.07 kPa to about 172 kPa), preferably about 0.1 psig to about 10 psig (about 0.7 kPa to about 70 kPa). The hydrogen partial pressure may be adjusted to modify the length ratio of the block copolymers obtained according to the disclosed methods.

After polymerization in the last separator to achieve the desired number of blocks in the block copolymer, the residual effluent may be quenched and transferred to devolatilization and finishing units.

Catalyst System

Catalyst systems suitable for use in conjunction with the method of the present invention can preferably comprise metallocene catalysts and other single site catalysts because these catalysts generally produce polymers with narrow molecular weight distribution. The PDI values for polymers made with metallocene catalyst systems in homogeneous polymerization media are typically close to the statistically expected value of 2.0. However, any polymerization catalyst capable of polymerizing the monomers and comonomers disclosed can be used if the catalyst is sufficiently active under the polymerization conditions disclosed herein. Thus, Group-3-10 transition metals can form suitable polymerization catalysts. A suitable olefin polymerization catalyst will be able to coordinate to, or otherwise associate with, an alkenyl unsaturation. Examples of olefin polymerization catalysts can include, but are not limited to, Ziegler-Natta catalyst compounds, metallocene catalyst compounds, late transition metal catalyst compounds, and other non-metallocene catalyst compounds.

As disclosed herein, Ziegler-Natta catalysts are those referred to as first, second, third, fourth, and fifth generation catalysts in the Propylene Handbook, E. P. Moore, Jr., Ed., Hanser, N.Y., 1996. Metallocene catalysts in the same reference are described as sixth generation catalysts. One exemplary non-metallocene catalyst compound comprises non-metallocene metal-centered, heteroaryl ligand catalyst compounds (where the metal is chosen from the Group 4, 5, 6, the lanthanide series, or the actinide series of the Periodic Table of the Elements).

Just as in the case of metallocene catalysts, these non-metallocene metal-centered, heteroaryl ligand catalyst compounds are typically made fresh by mixing a catalyst precursor compound with one or more activators. Non-metallocene metal-centered, heteroaryl ligand catalyst compounds are described in detail in PCT Patent Publications Nos. WO 02/38628, WO 03/040095 (pages 21 to 51), WO 03/040201 (pages 31 to 65), WO 03/040233 (pages 23 to 52), WO 03/040442 (pages 21 to 54), WO 2006/38628, and U.S. Patent Application Publication No. 2008/0153997, each of which is herein incorporated by reference.

Activators and associated activation methods can be used in a catalyst system. Examples of activators include, but are not limited to, aluminoxane and aluminum alkyl activators, ionizing activators, and nonionizing activators.

Examples of aluminoxane and aluminum alkyl activators and associated methods can be found in U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, and 5,103,031; European Patent and Application Publication Nos. EP 0 561 476 A1, EP 0 279 586 B1, EP 0 516 476 A, and EP 0 594 218 A1; and PCT Patent Publications No. WO 94/10180, which are each incorporated herein by reference.

Examples of ionizing activators and associated methods can be found in European Patent and Application Publication Nos. EP 0 570 982 A, EP 0 520 732 A, EP 0 495 375 A, EP 0 500 944 B1, EP 0 277 003 A and EP 0 277 004 A; and U.S. Pat. Nos. 5,153,157, 5,198,401, 5,066,741, 5,206, 197, 5,241,025, 5,384,299, and 5,502,124.

Examples of nonionizing activators and associated methods can be found in E. Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).

The catalyst system present in the reactor may have a catalyst concentration of about 0.05 ppm to about 1000 ppm, preferably of about 0.1 ppm to about 100 ppm. The catalyst concentration may be adjusted to modify the length ratio of the block copolymers obtained according to the disclosed methods.

Monomers and Comonomers

Any monomer and comonomer having one or more (non-conjugated) aliphatic double bond(s) and two or more carbon atoms may be used. Examples of monomers and comonomers include, but are not limited to, α-olefins (e.g., ethylene, propylene, butene-1, hexene-1, octene-1, decene-1, and dodecene-1), substituted olefins (e.g., styrene, paramethylstyrene, and vinylcyclohexane), non-conjugated dienes (e.g., vinylcyclohexene), α,ω-dienes (e.g., 1,5-hexadiene and 1,7-octadiene), cycloolefins (e.g., cyclopentene, cyclohexene, and cyclohexadiene), norbornene, and the like, and any combination thereof.

Olefin monomers or comonomers can be used. Advantageous monomers and comonomers include $C_2$ to $C_{100}$ olefins, advantageously $C_2$ to $C_{60}$ olefins, advantageously $C_3$ to $C_{40}$ olefins, advantageously $C_3$ to $C_{20}$ olefins, advantageously $C_3$ to $C_{12}$ olefins. Monomers and comonomers can include linear, branched or cyclic alpha-olefins, advantageously $C_3$ to $C_{100}$ alpha-olefins, advantageously $C_3$ to $C_{60}$ alpha-olefins, advantageously $C_3$ to $C_{40}$ alpha-olefins advantageously $C_3$ to $C_{20}$ alpha-olefins, and advantageously $C_3$ to $C_{12}$ alpha-olefins. Advantageous olefin monomers and comonomers can be one or more of ethylene, propylene, butene, pentene, hexene, heptene, octene, nonene, decene, dodecene, 4-methylpentene-1,3-methylpentene-1,3,5,5-trimethylhexene-1, and 5-ethylnonene-1.

Aromatic-group-containing monomers and comonomers containing up to 30 carbon atoms can be used. Suitable aromatic-group-containing monomers and comonomers comprise at least one aromatic structure, advantageously from one to three, more advantageously a phenyl, indenyl, fluorenyl, or naphthyl moiety. The aromatic-group-containing monomers and comonomers further comprise at least one polymerizable double bond such that after polymerization, the aromatic structure will be pendant from the polymer backbone. The aromatic group containing monomers and comonomers can further be substituted with one or more hydrocarbyl groups including, but not limited to, $C_1$ to $C_{10}$ alkyl groups. Additionally, two adjacent substitutions can be joined to form a ring structure. Advantageous aromatic-group-containing monomers and comonomers contain at least one aromatic structure appended to a polymerizable olefinic moiety. Particularly advantageous aromatic monomers include styrene, alpha-methylstyrene, para-alkylstyrenes, vinyltoluenes, vinylnaphthalene, allyl benzene, and indene, especially styrene, paramethylstyrene, 4-phenyl-butene-1 and allylbenzene.

Non-aromatic cyclic group containing monomers and comonomers can be used. These monomers and comonomers can contain up to 30 carbon atoms. Suitable non-aromatic cyclic group containing monomers and comonomers advantageously have at least one polymerizable olefinic group that is either pendant on the cyclic structure, or is part of the cyclic structure. The cyclic structure can also be further substituted by one or more hydrocarbyl groups such as, but not limited to, $C_1$ to $C_{10}$ alkyl groups. Advantageous non-aromatic cyclic group containing monomers and comonomers include vinylcyclohexane, vinylcyclohexene, vinylnorbornene, ethylidene norbornene, cyclopentadiene, cyclopentene, cyclohexene, cyclobutene, vinyladamantad and the like.

Diolefin monomers and comonomers can be used. Advantageous diolefin monomers and comonomers include any hydrocarbon structure, advantageously $C_4$ to $C_{30}$, having at least two unsaturated bonds, wherein at least two of the unsaturated bonds are readily incorporated into a polymer by either a stereospecific or a non-stereospecific catalyst(s). It is further advantageous that the diolefin monomers be selected from alpha-omega diene monomers and comonomers (e.g., divinyl monomers and comonomers). More advantageously, the diolefin monomers and comonomers are linear divinyl monomers, most advantageously to those containing from 4 to 30 carbon atoms. Examples of advantageous dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly advantageous dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Advantageous cyclic dienes include cyclopentadiene, vinylnorbornene, norbornadiene, ethylidene norbornene, divinylbenzene, dicyclopentadiene or higher ring containing diolefins with, or without, substituents at various ring positions.

Quenching Agents

Quenching agents prevent further polymerization of the monomers and comonomers after a designated amount of polymer has been produced. Small, polar, protic molecules, such as water, methanol, or isopropanol may be used as quenching agents.

Example Embodiments

A first nonlimiting example embodiment is a method comprising polymerizing a feedstock comprising a monomer and a comonomer under first polymerization conditions in the presence of a catalyst in a reactor to produce a first effluent comprising a first polyolefin block, an unreacted monomer, and an unreacted comonomer; blending the first effluent with a coordinative chain transfer polymerization agent to produce a mixture; and polymerizing the mixture in a separator under second polymerization conditions to cause the unreacted monomer and the unreacted comonomer to polymerize onto one end of the first polyolefin block as a second polyolefin block, thereby forming a block copolymer, wherein the first polyolefin block has a first comonomer content and the second polyolefin block has a second comonomer content that is different than the first comonomer content. Optionally, this method can further include one or more of the following: Element 1: wherein the first polymerization conditions differ from the second polymerization conditions by a parameter selected from the group consisting of: a temperature, a pressure, a relative concentration of monomer and comonomer, a catalyst composition, and any combination thereof; Element 2: wherein a temperature of the first polymerization conditions differs from a temperature of the second polymerization conditions by about 5° C. to about 80° C.; Element 3: wherein a pressure of the first polymerization conditions differs from a pressure of the second polymerization conditions by about 1 psig to about 5 psig; Element 4: wherein a relative concentration of monomer and comonomer of the first polymerization conditions differs from a relative concentration of monomer and comonomer of the second polymerization conditions by about 1.1 times to about 100 times; Element 5: further comprising adding additional monomer into the first effluent during the step of blending the first effluent with the coordinative chain transfer polymerization agent; Element 6: further comprising adding additional comonomer into the first effluent during the step of blending the first effluent with the coordinative chain transfer polymerization agent; Element 7: wherein a second effluent comprises the block copolymer, the unreacted monomer, and the unreacted comonomer and further comprising quenching the second effluent; Element 8: Element 7 and further comprising devolatilizing the second effluent after quenching the second effluent to remove volatile components; Element 9: wherein the separator is a first separator, wherein the coordinative chain transfer polymerization agent is a first coordinative chain transfer polymerization agent, wherein the second effluent comprises the block copolymer, the unreacted monomer, and the unreacted comonomer, and wherein the method further comprises: blending the second effluent with a second coordinative chain transfer polymerization agent to produce a second mixture; and polymerizing the second mixture in a second separator under third polymerization conditions to cause the unreacted monomer and the unreacted comonomer to polymerize onto one end of the second polyolefin block as a third polyolefin block of the block copolymer, wherein the third polyolefin block has a third comonomer content that is different than the second comonomer content; Element 10: Element 9 and wherein the second polymerization conditions differ from the third polymerization conditions by a parameter selected from the group consisting of: a temperature, a pressure, a residence time, a relative concentration of monomer and comonomer, a catalyst composition, and any combination thereof; Element 11: Element 10 and wherein the temperature of the second polymerization conditions differs from a temperature of the third polymerization conditions by about 5° C. to about 80° C.; Element 12: Element 10 and wherein the pressure of the second polymerization conditions differs from a pressure of the third polymerization conditions by about 1 psig to about 5 psig; Element 13: Element 10 and wherein the relative concentration of monomer and comonomer of the second polymerization conditions differs from a relative concentration of monomer and comonomer of the third polymerization conditions by about 1.1 times to about 100 times; Element 14: further comprising adding additional monomer into the second effluent during the step of blending the second effluent with the second coordinative chain transfer polymerization agent; Element 15: further comprising adding additional comonomer into the second effluent during the step of blending the second effluent with the second coordinative chain transfer polymerization agent; Element 16: wherein a third effluent comprises the block copolymer, the unreacted monomer, and the unreacted comonomer exiting the second separator, and wherein the method further comprising quenching the third effluent; Element 17: wherein the monomer is selected from the group consisting of: ethylene, propylene, butene, pentene, hexene, heptene, octene, nonene, decene, dodecene, 4-methylpentene-1,3-methylpentene-1,3,5,5-trimethylhexene-1,5-ethylnonene-1, styrene, alpha-methylstyrene, para-alkylstyrenes, vinyltoluenes, vinylnaphthalene, allyl benzene, and indene, especially styrene, paramethylstyrene, 4-phenylbutene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene; Element 18: wherein the comonomer is different than the monomer and is selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methylstyrene, para-alkylstyrenes, vinyltoluenes, vinylnaphthalene, allyl benzene, and indene, especially styrene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene. Examples of combinations of the foregoing include, but are not limited to, Element 1 in combination with one or more of Elements 2-4 and, optionally, in further combination with one or more of Elements 5-6; Element 1 in combination with Element 7 and, optionally, in further combination with Element 8; Element 1 in combination with Element 9; Element 1 in combination with one or more of Elements 2-4 and, optionally, in further combination with one or more of Elements 5-6, and, optionally, in further combination with Element 9; Element 1 optionally in combination with one or more of Elements 2-4 and, optionally, in further combination with one or more of Elements 5-6, in further combination with Elements 9 and 10, optionally in further combination with one or more of Elements 11-13, and, optionally, in further combination with one or more of Elements 14-16. Element 1 in further combination with one or more of Elements 17-18; Element 1 in further combination with Element 9, in further combination with one or more of Elements 17-18.

Unless otherwise indicated, all numbers expressing quantities of ingredients, properties such as molecular weight, reaction conditions, and so forth, used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While methods are described herein in terms of "comprising" various components or steps, the methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1. A polymerization reaction producing a diblock copolymer was simulated with one reactor, one separator, and two static mixers set up in the model as shown in FIG. 1. Diethyl zinc was added into the first static mixer and a quenching agent, either water or carbon dioxide, was added in the second static mixer. The simulation software used was Aspen Plus version 9.0 with the Aspen Polymer Module. The thermodynamic method was based on Perturbed-Chain Statistical Association Fluid Theory (PC-SAFT). The required material properties were directly obtained from the property data banks implemented in Aspen Plus. A CSTR module was used as the reactor and a Flash 2 module was used as the flash vessel. The ranges of temperature, pressure, monomer and comonomer concentrations, etc., were designed based on an industrial scale solution polymerization process.

The polymerization reaction simulated in Example 1 was the copolymerization of ethylene and propylene. Copolymerization kinetics were obtained from the literature and implemented in the simulator. Ethylene was treated as the minor comonomer component. Therefore, both heat and mass balance and polymer properties, including chemical composition and molecular weight distribution, can be accurately modeled. A metallocene catalyst was used in the catalyst system.

Ten cases were modeled in Example 1. The propylene ($C_3$) to ethylene ($C_2$) weight ratio varied from 56.9 to 7.2 showing the influence of monomer to comonomer weight ratio over the final diblock copolymer microstructure. The operation conditions (monomer to comonomer feed ratio, reactor temperature, flash vessel temperature, and flash vessel pressure) are shown in Table 1. The corresponding product properties (block copolymer concentration, comonomer contents in the blocks, and ratio of block lengths) for each cases are shown in Table 2.

TABLE 1

| | Operation Conditions | | | |
|---|---|---|---|---|
| Case No. | $C_3/C_2$ Feed Ratio | Reactor Temp (° C.) | Flash Temp (° C.) | Flash Pressure (psig) |
| 1 | 56.9 | 90 | 120 | 135 |
| 2 | 36.2 | 90 | 120 | 135 |

TABLE 1-continued

| | Operation Conditions | | | |
|---|---|---|---|---|
| Case No. | $C_3/C_2$ Feed Ratio | Reactor Temp (° C.) | Flash Temp (° C.) | Flash Pressure (psig) |
| 3 | 26.1 | 90 | 120 | 135 |
| 4 | 20.3 | 90 | 120 | 135 |
| 5 | 16.2 | 90 | 120 | 135 |
| 6 | 13.6 | 90 | 120 | 135 |
| 7 | 11.4 | 90 | 120 | 135 |
| 8 | 9.5 | 90 | 120 | 135 |
| 9 | 8.2 | 90 | 120 | 135 |
| 10 | 7.2 | 90 | 120 | 135 |

TABLE 2

| | Product Properties | | | | |
|---|---|---|---|---|---|
| Case No. | Block Copolymer Conc. (wt %) | Comonomer Content in Block 1 (wt %) | Comonomer Content in Block 2 (wt %) | Comonomer Content Ratio of Block 1 over Block 2 | Block 1 Length over Block 2 Length Ratio |
| 1 | 45.7 | 4.0 | 0.7 | 5.8 | 7.1 |
| 2 | 44.5 | 6.1 | 1.1 | 5.5 | 7.3 |
| 3 | 43.3 | 8.1 | 1.5 | 5.2 | 7.4 |
| 4 | 42.1 | 10.1 | 2.0 | 5.0 | 7.6 |
| 5 | 40.8 | 12.1 | 2.5 | 4.8 | 7.8 |
| 6 | 39.6 | 13.9 | 3.1 | 4.6 | 7.9 |
| 7 | 38.3 | 15.9 | 3.7 | 4.3 | 8.1 |
| 8 | 36.8 | 18.1 | 4.4 | 4.1 | 8.3 |
| 9 | 35.4 | 20.2 | 5.1 | 4.0 | 8.6 |
| 10 | 34.1 | 22.0 | 5.8 | 3.8 | 8.7 |

This example illustrates that decreasing the propylene to ethylene ratio can be used to decrease the difference of comonomer content between the two blocks of the diblock copolymer as well as to increase the ratio of the length of the first block to the length of the second block. The ratio of length of the first block to the length of the second block can be further fine-tuned by varying hydrogen and catalyst concentration.

Example 2. Example 2 uses the same simulation conditions as Example 1, except that in Example 2, the feed ratio of propylene ($C_3$) to ethylene ($C_2$) is fixed and the flash pressure varies. Five cases were modeled in this example showing the influence of varying the pressure of the flash vessel over the final diblock copolymer composition. The operation conditions (monomer to comonomer feed ratio, reactor temperature, flash vessel temperature, and flash vessel pressure) are shown in Table 3. The corresponding product properties (block copolymer concentration, comonomer contents in the blocks, and ratio of block lengths) for each of these cases are shown in Table 4.

TABLE 3

| | Operation Conditions | | | |
|---|---|---|---|---|
| Case No. | $C_3/C_2$ Feed Ratio | Reactor Temp (° C.) | Flash Temp (° C.) | Flash Pressure (psig) |
| 11 | 15.0 | 90 | 120 | 95 |
| 12 | 15.0 | 90 | 120 | 110 |
| 13 | 15.0 | 90 | 120 | 135 |
| 14 | 15.0 | 90 | 120 | 150 |
| 15 | 15.0 | 90 | 120 | 165 |

TABLE 4

| | Product Properties | | | |
|---|---|---|---|---|
| Case No. | Block Co-polymer Conc. (wt %) | Comonomer Content in Block 1 (wt %) | Comonomer Content in Block 2 (wt %) | Comonomer Content Ratio of Block 1 over Block 2 | Block 1 Length over Block 2 Length Ratio |
| 11 | 8.6 | 12.9 | 2.3 | 5.5 | 25.9 |
| 12 | 20.9 | 12.9 | 2.4 | 5.3 | 14.5 |
| 13 | 34.8 | 12.9 | 2.6 | 4.9 | 9.1 |
| 14 | 40.8 | 12.9 | 2.8 | 4.6 | 7.7 |
| 15 | 45.8 | 12.9 | 2.9 | 4.4 | 6.8 |

This example illustrates that decreasing the flash vessel pressure results in more unreacted monomer and comonomer being evaporated from the flash vessel, leaving less to polymerize. Therefore, the diblock copolymer concentration decreases as less block 2 is produced in the flash vessel. The comonomer content ratio of block 1 to block 2 increases as less comonomer (ethylene $C_2$) is available to react in the flash vessel.

Example 3. Example 3 uses the same simulation conditions as Example 1, except that in Example 3, the feed ratio of propylene ($C_3$) to ethylene ($C_2$) is fixed and the flash temperature varies. Six cases were modeled in this example showing the influence of varying the temperature of the flash vessel over the final diblock copolymer composition. The operation conditions (monomer to comonomer feed ratio, reactor temperature, flash vessel temperature, and flash vessel pressure) are shown in Table 5. The corresponding product properties (block copolymer concentration, comonomer contents in the blocks, and ratio of block lengths) for each of these cases are shown in Table 6.

TABLE 5

| | Operation Condition | | | |
|---|---|---|---|---|
| Case No. | $C_3/C_2$ Feed Ratio | Reactor Temp (° C.) | Flash Temp (° C.) | Flash Pressure (psig) |
| 16 | 15.0 | 90 | 90 | 135 |
| 17 | 15.0 | 90 | 100 | 135 |
| 18 | 15.0 | 90 | 110 | 135 |
| 19 | 15.0 | 90 | 120 | 135 |
| 20 | 15.0 | 90 | 130 | 135 |
| 21 | 15.0 | 90 | 140 | 135 |

TABLE 6

| | Product Result | | | | |
|---|---|---|---|---|---|
| Case No. | Block Co-polymer Conc. (wt %) | Comonomer Content in Block 1 (wt %) | Comonomer Content in Block 2 (wt %) | Comonomer Content Ratio of Block 1 over Block 2 | Block 1 Length over Block 2 Length Ratio |
| 16 | 49.4 | 12.9 | 4.7 | 2.7 | 1.3 |
| 17 | 49.2 | 12.9 | 3.7 | 3.5 | 2.0 |
| 18 | 46.2 | 12.9 | 3.1 | 4.2 | 3.7 |
| 19 | 40.3 | 12.9 | 2.8 | 4.7 | 7.8 |
| 20 | 30.1 | 12.9 | 2.6 | 5.0 | 19.8 |
| 21 | 12.6 | 12.9 | 2.5 | 5.1 | 57.6 |

This example illustrates that increasing the flash vessel temperature results in more unreacted monomer and comonomer, increasing the difference in comonomer content between block 1 and block 2 and decreasing the block copolymer concentration as less block 2 is produced in the flash vessel.

These examples illustrate that performing a polymerization by continuing the polymerization reaction in a separator (or flash vessel) can be effectively controlled by varying the feedstock monomer to comonomer ratio, flash temperature and pressure.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered, combined, or modified, and all such variations are considered within the scope and spirit of the present invention. The invention illustratively disclosed herein suitably may be practiced in the absence of any element that is not specifically disclosed herein and/or any optional element disclosed herein. While the methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method for making block copolymers, comprising:
   polymerizing a feedstock comprising a monomer and a comonomer under polymerization conditions in the presence of a catalyst in a reactor to produce a first effluent comprising a first polyolefin block, an unreacted monomer, and an unreacted comonomer;
   removing the first effluent from the reactor;
   blending the first effluent with a coordinative chain transfer polymerization agent to produce a mixture;
   introducing the mixture comprising the first effluent and the coordinative chain transfer polymerization agent to a separator;
   operating the separator at a higher temperature, or lower pressure, or both higher temperature and lower pressure than in the reactor to remove volatile monomer, comonomer and solvent from the separator; and
   polymerizing the mixture comprising the first effluent and the coordinative chain transfer polymerization agent in the separator at the separator conditions to cause the unreacted monomer and the unreacted comonomer to polymerize onto one end of the first polyolefin block as a second polyolefin block, thereby forming a block copolymer, wherein the first polyolefin block has a first comonomer content and the second polyolefin block has a second comonomer content that is different than the first comonomer content.

2. The method of claim 1, wherein the polymerization conditions in the reactor differ from the separator conditions by a parameter selected from the group consisting of: a relative concentration of monomer and comonomer, a catalyst composition, and any combination thereof.

3. The method of claim 2, wherein the polymerization conditions in the reactor comprise a polymerization temperature and wherein the separator is operated at a temperature that is about 5° C. to about 80° C. higher than the polymerization temperature.

4. The method of claim 2, wherein the polymerization conditions in the reactor comprise a polymerization pressure and wherein the separator is operated at pressure that is about 1 psig to about 5 psig less than the polymerization pressure.

5. The method of claim 2, wherein a relative concentration of monomer and comonomer of the polymerization conditions in the reactor differs from a relative concentration of monomer and comonomer of the separator conditions by about 1.1 times to about 100 times in the separator.

6. The method of claim 1, further comprising adding additional monomer into the first effluent during the step of blending the first effluent with the coordinative chain transfer polymerization agent.

7. The method of claim 1, further comprising adding additional comonomer into the first effluent during the step of blending the first effluent with the coordinative chain transfer polymerization agent.

8. The method of claim 1, wherein a second effluent comprises the block copolymer, the unreacted monomer, and the unreacted comonomer exiting the separator, and wherein the method further comprises quenching the second effluent.

9. The method of claim 8, further comprising devolatilizing the second effluent exiting the separator after quenching the second effluent to remove volatile components.

10. The method of claim 1, wherein the separator is a first separator that operates under first separator conditions, wherein the coordinative chain transfer polymerization agent is a first coordinative chain transfer polymerization agent, wherein a second effluent comprises the block copolymer, the unreacted monomer, and the unreacted comonomer, and wherein the method further comprises:
    removing the second effluent from the first separator;
    blending the second effluent with a second coordinative chain transfer polymerization agent to produce a second mixture;
    introducing the second mixture comprising the second effluent and the second coordinative chain transfer polymerization agent to a second separator;
    polymerizing the second mixture in the second separator under second separator conditions to cause the unreacted monomer and the unreacted comonomer to polymerize onto one end of the second polyolefin block as a third polyolefin block of the block copolymer, wherein the third polyolefin block has a third comonomer content that is different than the second comonomer content.

11. The method of claim 10, wherein the first separator conditions differ from the second separator conditions by a parameter selected from the group consisting of: a temperature, a pressure, a residence time, a relative concentration of monomer and comonomer, a catalyst composition, and any combination thereof.

12. The method of claim 11, wherein the temperature of the first separator conditions differs from a temperature of the second separator conditions by about 5° C. to about 80° C.

13. The method of claim 11, wherein the pressure of the first separator conditions differs from a pressure of the second separator conditions by about 1 psig to about 5 psig.

14. The method of claim 11, wherein the relative concentration of monomer and comonomer of the first separator conditions differs from a relative concentration of monomer and comonomer of the second separator conditions by about 1.1 times to about 100 times.

15. The method of claim 11, further comprising adding additional monomer into the second effluent during the step of blending the second effluent with the second coordinative chain transfer polymerization agent.

16. The method of claim 11, further comprising adding additional comonomer into the second effluent during the step of blending the second effluent with the second coordinative chain transfer polymerization agent.

17. The method of claim 11, wherein a third effluent comprises the block copolymer, the unreacted monomer, and the unreacted comonomer exiting the second separator, and wherein the method further comprising quenching the third effluent.

18. The method of claim 1, wherein the monomer is selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methylstyrene, para-alkylstyrenes, vinyltoluenes, vinylnaphthalene, allyl benzene, and indene, especially styrene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene.

19. The method of claim 1, wherein the comonomer is different than the monomer and is selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methylstyrene, para-alkylstyrenes, vinyltoluenes, vinylnaphthalene, allyl benzene, and indene, especially styrene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene.

20. A method for making block copolymers, comprising:
    polymerizing a feedstock comprising a monomer and a comonomer in the presence of a catalyst in a reactor at a temperature and pressure sufficient to produce a first effluent comprising a first polyolefin block, an unreacted monomer, and an unreacted comonomer;
    removing the first effluent from the reactor;
    blending the first effluent with a coordinative chain transfer polymerization agent to produce a mixture;
    introducing the mixture comprising the first effluent and the coordinative chain transfer polymerization agent to a first separator;
    operating the first separator at a pressure that is about 1 psig to about 5 psig less than the pressure of the reactor or at a temperature that is about 5° C. to about 80° C.

more than the temperature of the reactor to remove volatile monomer, comonomer and solvent from the separator;

polymerizing the mixture comprising the first effluent and the coordinative chain transfer polymerization agent in the first separator to cause the unreacted monomer and the unreacted comonomer to polymerize onto one end of the first polyolefin block as a second polyolefin block, thereby forming a block copolymer, wherein the first polyolefin block has a first comonomer content and the second polyolefin block has a second comonomer content that is different than the first comonomer content;

removing the second effluent from the first separator;

blending the second effluent with a second coordinative chain transfer polymerization agent to produce a second mixture;

introducing the second mixture comprising the second effluent and the second coordinative chain transfer polymerization agent to a second separator;

operating the second separator at a pressure that is about 1 psig to about 5 psig less than the pressure of the reactor or at a temperature that is about 5° C. to about 80° C. more than the temperature of the reactor to remove volatile monomer, comonomer and solvent from the second separator; and polymerizing the second mixture in the second separator to cause the unreacted monomer and the unreacted comonomer to polymerize onto one end of the second polyolefin block as a third polyolefin block of the block copolymer, wherein the third polyolefin block has a third comonomer content that is different than the second comonomer content.

* * * * *